United States Patent [19]
Hanley

[11] Patent Number: 5,233,971
[45] Date of Patent: Aug. 10, 1993

[54] SOLAR HEATED DRIVEWAY APPARATUS

[76] Inventor: Robert M. Hanley, 5622 W. Grover St., Chicago, Ill. 60630

[21] Appl. No.: 916,490

[22] Filed: Jul. 20, 1992

[51] Int. Cl.$^5$ ............................................... F24J 2/00
[52] U.S. Cl. .................................... 126/569; 126/633; 165/45
[58] Field of Search .................... 165/45; 126/569, 633

[56] References Cited

U.S. PATENT DOCUMENTS

| | | | |
|---|---|---|---|
| 3,002,729 | 10/1961 | Welsh | 165/183 |
| 3,279,535 | 10/1966 | Huet | 165/183 |
| 3,521,699 | 7/1970 | Van Huisen | 165/45 |
| 4,008,709 | 2/1977 | Jardine | 165/45 |
| 4,693,300 | 9/1987 | Adachi | 165/45 |
| 4,880,051 | 11/1989 | Ohashi | 165/45 |

Primary Examiner—Carroll B. Dority
Attorney, Agent, or Firm—Leon Gilden

[57] ABSTRACT

A vehicular driveway pad is arranged to include a solar collector panel positioned adjacent thereto in a spaced relationship, having a first fluid conduit directed from the solar collector panel and a serpentine second conduit path under the driveway to effect heating thereof, with the serpentine path having radial stabilizer fins mounted to an exterior surface of the serpentine path for communicating and transmitting heat from the second conduit to the driveway. Metallic plates arranged in a spaced relationship relative to the driveway path projecting therethrough and in mechanical communication with the serpentine path of the second conduit is arranged to enhance heat flow to assist in melting snow and ice relative to the driveway pad.

3 Claims, 4 Drawing Sheets

SOLAR HEATED DRIVEWAY APPARATUS

BACKGROUND OF THE INVENTION

1. Field of the Invention

The field of invention relates to driveway apparatus, and more particularly pertains to a new and improved solar heated driveway apparatus wherein the same is arranged to direct fluid and heat flow through the pad of the driveway for melting snow and ice therefrom.

2. Description of the Prior Art

Various pad structure to melt snow and the like therefrom is available in the prior art and exemplified in the U.S. Pat. No. 4,967,057 directed to a snow melting heat mat; U.S. Pat. No. 3,123,320 to a heated ground cover for the dissipation of moisture; and U.S. Pat. No. 4,314,772 to Lestrand sets forth a ground heating system for supplying water to control ground humidity.

The prior art has heretofore recognized a need for heating of various environments utilizing a heated pad structure, but has heretofore failed to provide for the solar efficient heating of a vehicular driveway pad as set forth by the instant invention and in this respect, the present invention substantially fulfills this need.

SUMMARY OF THE INVENTION

In view of the foregoing disadvantages inherent in the known types of solar heated apparatus now present in the prior art, the present invention provides a solar heated driveway apparatus wherein the same is arranged to impart heat to a driveway to enhance melting of snow and ice therefrom. As such, the general purpose of the present invention, which will be described subsequently in greater detail, is to provide a new and improved solar heated driveway apparatus which has all the advantages of the prior art solar heating apparatus and none of the disadvantages.

To attain this, the present invention provides a vehicular driveway pad arranged to include a solar collector panel positioned adjacent thereto in a spaced relationship, having a first fluid conduit directed from the solar collector panel and a serpentine second conduit path under the driveway to effect heating thereof, with the serpentine path having radial stabilizer fins mounted to an exterior surface of the serpentine path for communicating and transmitting heat from the second conduit to the driveway. Metallic plates arranged in a spaced relationship relative to the driveway path projecting therethrough and in mechanical communication with the serpentine path of the second conduit is arranged to enhance heat flow to assist in melting snow and ice relative to the driveway pad.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar heated driveway apparatus which has all the advantages of the prior art solar heating apparatus and none of the disadvantages.

It is another object of the present invention to provide a new and improved solar heated driveway apparatus which may be easily and efficiently manufactured and marketed.

It is a further object of the present invention to provide a new and improved solar heated driveway apparatus which is of a durable and reliable construction.

An even further object of the present invention is to provide a new and improved solar heated driveway apparatus which is susceptible of a low cost of manufacture with regard to both materials and labor, and which accordingly is then susceptible of low prices of sale to the consuming public, thereby making such solar heated driveway apparatus economically available to the buying public.

Still yet another object of the present invention is to provide a new and improved solar heated driveway apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
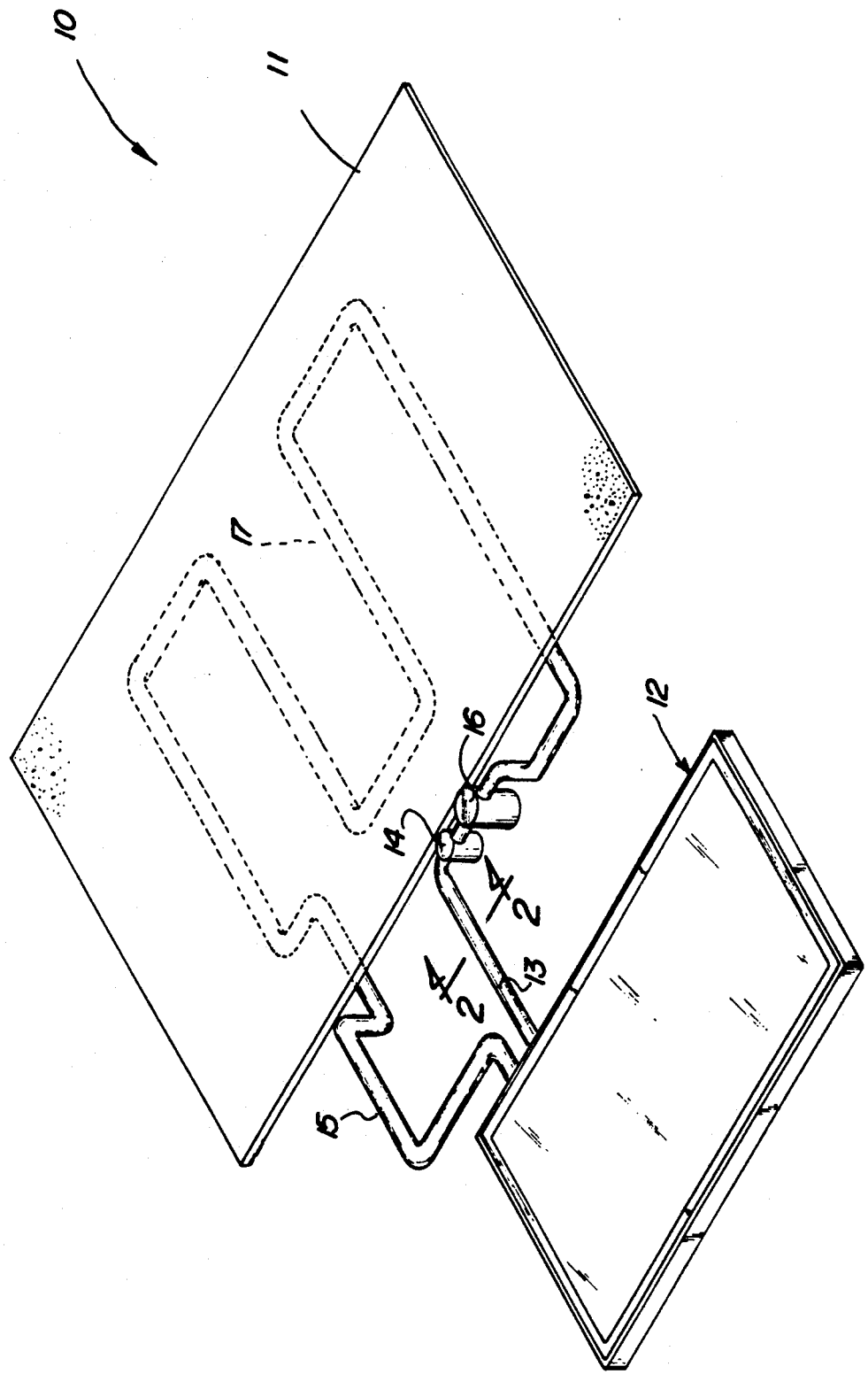
FIG. 1 is an isometric illustration of the instant invention.
Figure 3:
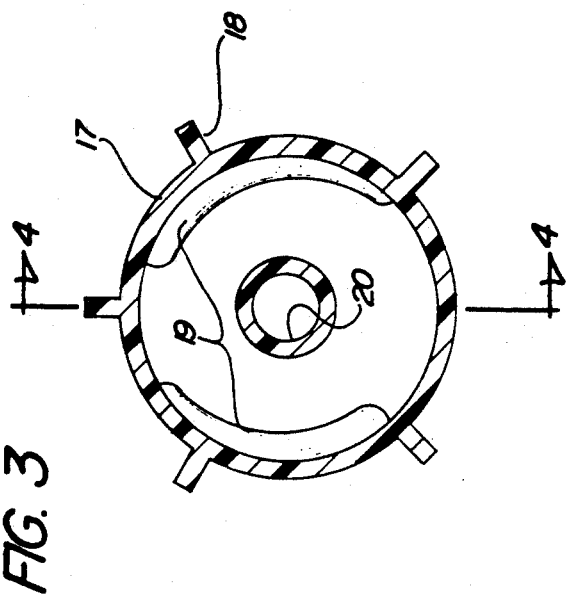
FIG. 3 is a cross-sectional illustration of the serpentine path below the associated driveway.
Figure 4:
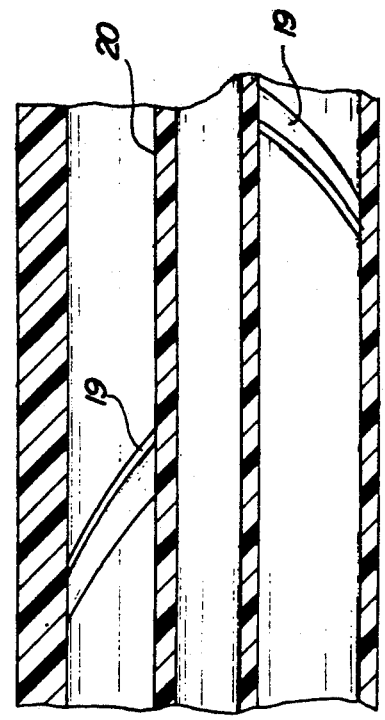
FIG. 4 is an orthographic view, taken along the lines 4—4 of FIG. 3 in the direction indicated by the arrows.
Figure 2:
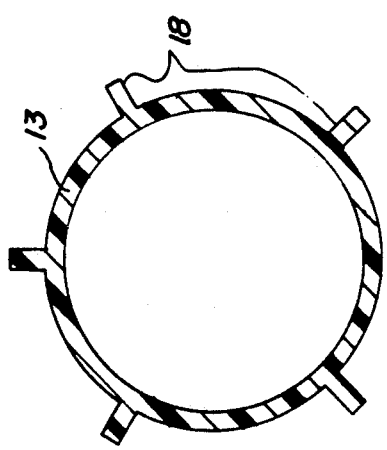
FIG. 2 is an orthographic view, taken along the lines 2—2 of FIG. 1 in the direction indicated by the arrows.
Figure 5:
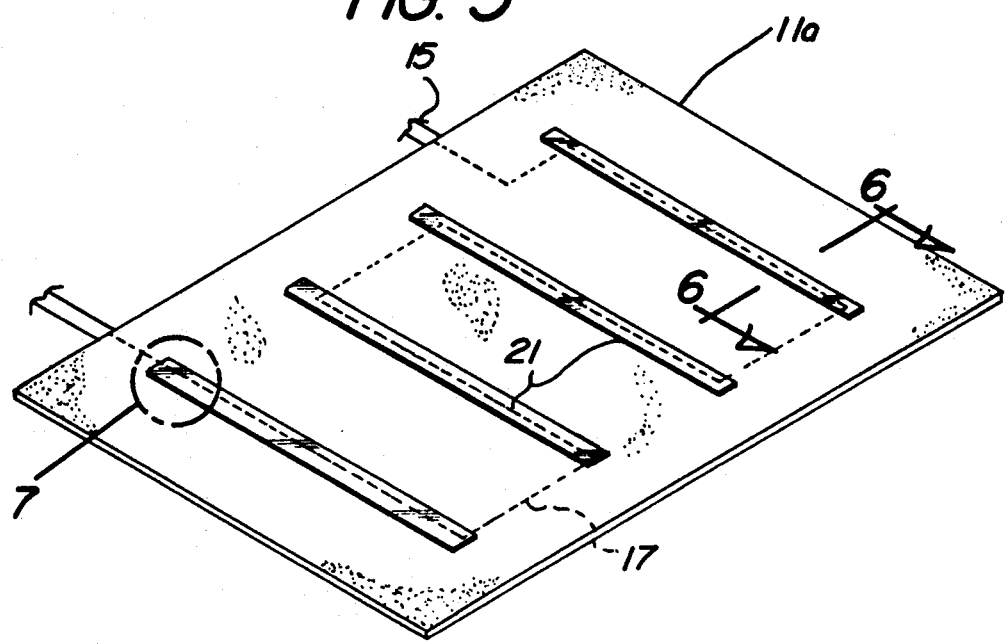
FIG. 5 is an isometric illustration of a modified driveway pad structure.
Figure 6:
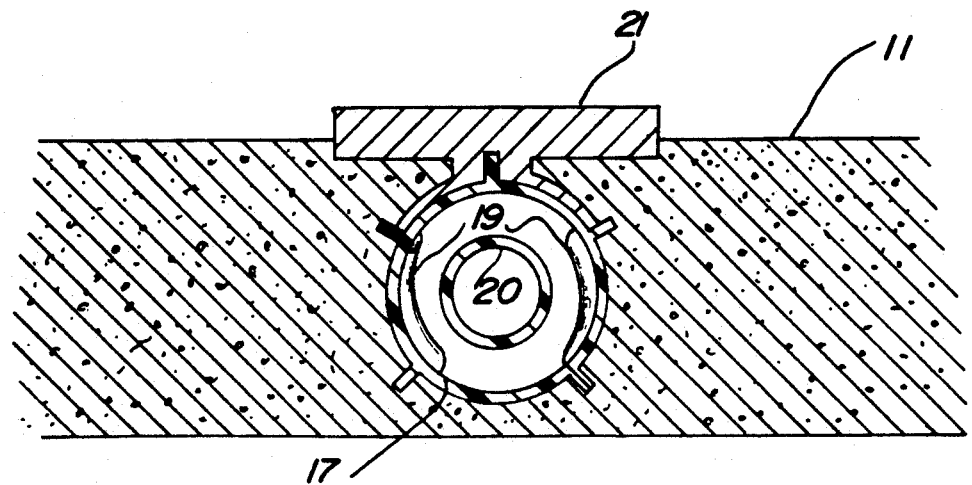
FIG. 6 is an orthographic view, taken along the lines 6—6 of FIG. 5 in the direction indicated by the arrows.
Figure 7:
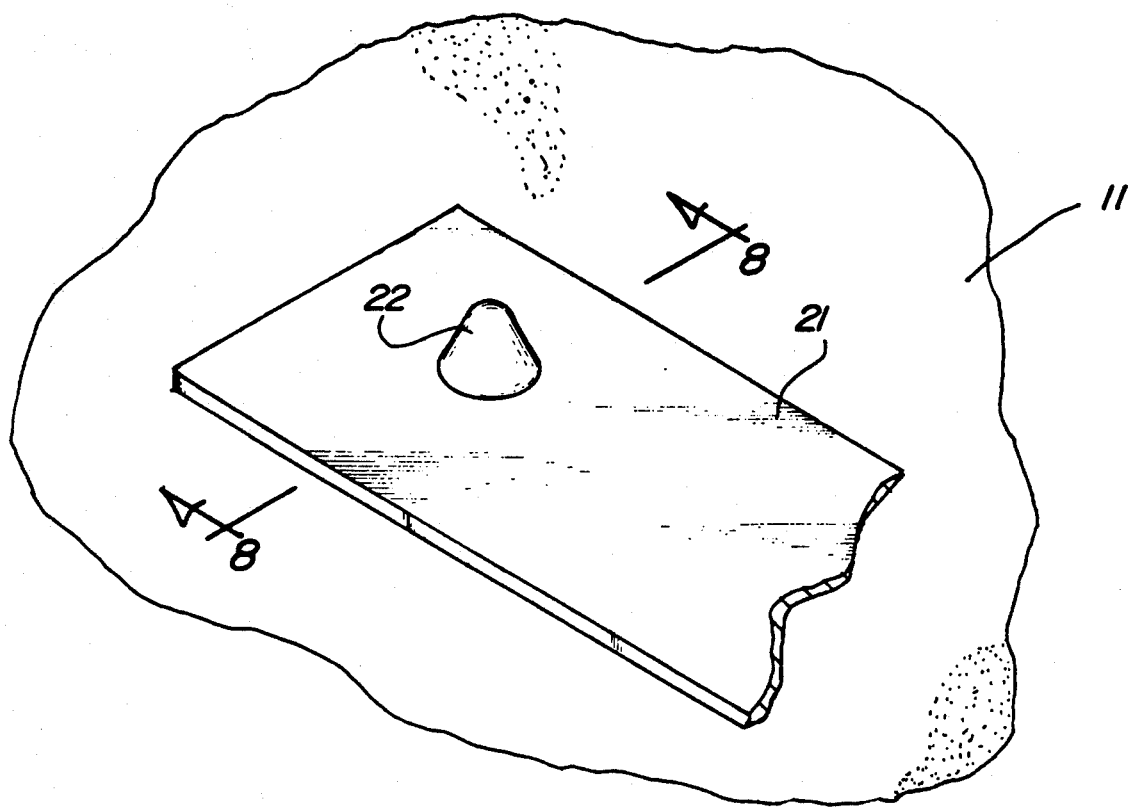
FIG. 7 is an enlarged isometric illustration of section 7 as set forth in FIG. 5.
Figure 8:
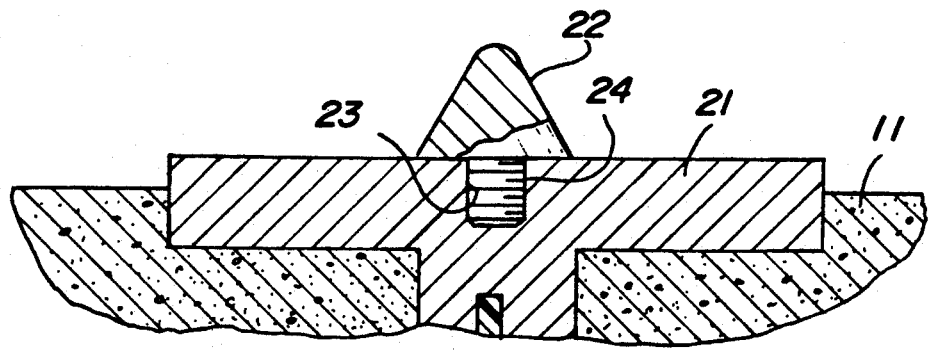
FIG. 8 is an orthographic view, taken along the lines 8—8 of FIG. 7 in the direction indicated by the arrows.

With reference now to the drawings, and in particular to FIGS. 1 to 8 thereof, a new and improved solar heated driveway apparatus embodying the principles and concepts of the present invention and generally designated by the reference numeral 10 will be described.

More specifically, the solar heated driveway apparatus 10 of the instant invention essentially comprises a vehicular driveway pad 11 arranged for accommodating a vehicle thereon, such as in a driveway for use by a dwelling, wherein typically a vehicle is stored. In such an environment, it is desired to maintain minimal amounts of ice and snow accumulation to permit ease of access to a vehicle positioned thereon. To this end, a solar collector panel 12 is provided arranged in a spaced relationship relative to the driveway pad 11. A first fluid conduit 13 is directed from a fluid pump 14 to the collector panel 12, with fluid directed to the fluid pump 14 from an expansion tank 16, with a second conduit serpentine path 17 positioned below the driveway pad 11 in fluid communication with a second fluid conduit 15 directed to the solar collector panel 12. The first and second fluid conduits 13 and 15, such as exemplified in FIG. 2, each include radial stabilizer fins 18 fixedly mounted exteriorly of the first and second fluid conduits 13 and 15 to afford stability to the organization when positioned below ground level, wherein the second conduit serpentine path 17 includes directing vanes 19 positioned coextensively throughout the second conduit serpentine path 17 to effect swirling of fluid therewithin to enhance heat transfer of the fluid through the serpentine path. Further, the second conduit serpentine path 17 includes a second conduit central tubular core 20 to increase velocity of fluid directed through the serpentine path, as well as maintaining fluid in communication with the outer tubular conduit arranged coaxially about the tubular core 20.

The FIGS. 5-8 utilizes a modified driveway path 11a having a plurality of spaced metallic plates 21 imbedded in the driveway pad 11 projecting from an exterior surface thereof. The metallic steel plates are in fixed and integral communication with the serpentine path conduits peripheral surface and with a plurality of the radial fins 18 thereof to enhance heat transfer from the second conduit serpentine path 17 through the metallic plates 21. Further to enhance traction when such plates in driveway pad 11 are positioned within a sloped orientation, traction projections 22 each having an externally threaded shank 24 are mounted in a longitudinal array projecting to a top surface of each of the metallic steel plates 21. The traction projections 22 include an externally threaded shank 24 received within an internally threaded bore 23 of the plates 21 to permit ease of insertion and removal of the projections during periods of need.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar heated driveway apparatus, comprising in combination, a vehicular driveway pad for accommodating a vehicle thereon, and a solar collector panel, the solar collector panel arranged in a spaced relationship relative to the vehicular driveway pad, and a fluid pump, with a first fluid conduit directed from the fluid pump to the solar collector panel, and a second ribbed fluid conduit directed from the solar collector panel to an orientation adjacent to and below the vehicular driveway pad, and a further second conduit having a serpentine path oriented below and fixedly mounted to the vehicular driveway pad, and the first and second conduit having an expansion tank at a terminal end of said first and second conduit spaced from the vehicular driveway pad, and the expansion tank arranged in fluid communication with the fluid pump, and the first fluid conduit and the second fluid conduit each include a radial array of stabilizer fins projecting beyond the first fluid conduit and the second fluid conduit, and the stabilizer fins arranged in a parallel relationship relative to one another coaxially aligned relative to the respective first fluid conduit and the second fluid conduit, and the further second fluid conduit includes a further array of stabilizer fins projecting exteriorly of the further second fluid conduit and a plurality of said further radial stabilizer fins fixedly mounted within said vehicular driveway pad below said top surface of said vehicular driveway pad, and said further second fluid conduit includes a central tubular core coextensive with and positioned coaxially aligned with and interiorly of said further second conduit, and said further second conduit further including a plurality of directing vanes helically mounted within said further second conduit between said further second conduit and said tubular core.

2. An apparatus as set forth in claim 1 wherein said vehicular driveway pad includes a plurality of spaced metallic plates directed into said vehicular driveway pad, with each of said metallic plates secured to said further second conduit, with each of said metallic plates fixedly secured to a plurality of said further radial fins.

3. An apparatus as set forth in claim 2 wherein said metallic plates include a plurality of internally threaded bores, and each internally threaded bore includes a traction projection, with each traction projection including an externally threaded shank threadedly received with one of said interiorly threaded bores to permit selective removal of said traction projections relative to said internally threaded bores.

* * * * *